United States Patent [19]

Boudreau

[11] 4,245,850
[45] Jan. 20, 1981

[54] SCISSOR FRAME LOCK

[75] Inventor: Robert J. Boudreau, Bedford, Pa.

[73] Assignee: Hedstrom Co., Bedford, Pa.

[21] Appl. No.: 61,500

[22] Filed: Jul. 27, 1979

[51] Int. Cl.$^3$ .............................................. B62B 7/10
[52] U.S. Cl. ........................... 280/87.02 W; 280/644; 280/649; 297/5; 403/92
[58] Field of Search .................... 280/87.05, 87.02 W, 280/87.03, DIG. 3, DIG. 4, 642, 641, 643, 644, 649, 650; 297/5; 403/92, 93, 96, 325, 327, 328; 248/166

[56] References Cited

U.S. PATENT DOCUMENTS

| 815,528 | 3/1906 | Haag | 403/96 |
|---|---|---|---|
| 2,722,104 | 11/1955 | Kanemoto | 403/96 |
| 3,337,230 | 8/1967 | Golding | 280/644 |
| 3,754,786 | 8/1973 | Boucher | 297/5 |
| 4,045,045 | 8/1977 | Boucher et al. | 280/87.05 |

FOREIGN PATENT DOCUMENTS 47-25422 11/1972 Japan .......................................... 403/92

Primary Examiner—David M. Mitchell
Attorney, Agent, or Firm—Cesari and McKenna

[57] ABSTRACT

A scissor frame lock includes a circular plate sandwiched between the corresponding legs of the scissor frame at their point of intersection. The legs and the plate are formed with aligned openings for slidably receiving a pivot pin. One end segment of the pivot pin is bent back on itself so that the end segment bypasses the adjacent leg and extends through a second opening in the plate. The pin is biased outwardly so that when the two legs are more or less perpendicular the pin segment projects into an opening in the other frame leg to lock the legs in that orientation. The legs are folded together by depressing the pin so as to disengage its end segment from that opening.

1 Claim, 4 Drawing Figures

SCISSOR FRAME LOCK

This invention relates to a lock for scissor frames of the type used to construct foldable children's playseats such as walkers, bouncers and the like. The lock is used to maintain the scissor frames in their open or erect position.

BACKGROUND OF THE INVENTION

Scissor frames comprise a pair of legs pivoted together intermediate their ends so that the legs can be moved between a first position wherein the legs are parallel to one another and a second position wherein the legs are more or less perpendicular and form a cross. A pair of such frames in conjunction with a spanning flexible sheet supported by the frames are used to construct various types of foldable supports such as seats, children's walkers, bouncers and the like. In some cases, it is desirable to lock these frames in their open position so as to maintain the support in its erect state. This is particularly so in the case of children's playseats and other juvenile furniture.

Some prior supports of the scissor frame variety do have locks of one kind or another. One type of lock used heretofore consists of a retractable pull button attached to one scissor frame member with its spring-loaded stem arranged to engage in an opening in the other scissor frame member when the two members assume a certain orientation. Other conventional locks used for this purpose include various types of latches hinged to one frame member and engageable with a lug on the other frame member, as well as various types of articulated overcentered struts. However, these prior locks have not been entirely satisfactory. Some are relatively inaccessible or difficult to operate. Others are relatively expensive to install and some are too easy to operate with the result that a child sitting in a playseat, for example, can release the lock so that the playseat folds inadvertently trapping the child in the seat.

SUMMARY OF THE INVENTION

Accordingly, it is an object of the present invention to provide an improved lock for scissor frames used as the supporting members in various types of furniture and particularly in children's playseats.

Another object of the invention is to provide such a lock which is relatively inexpensive to make.

A further object of the invention is to provide a scissor frame lock which is easy to operate for the average adult.

Another object of the invention is to provide a lock of this type which performs the dual function of a lock and the pivot for the scissor frame.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

For purposes of this description, we will describe the lock as it is used to lock a child's walker of the scissor frame variety in its erect position. The lock may be installed at one or both sides of the walker. It includes a rigid plate sandwiched between the two frame members at their point of intersection, and a pivot pin projecting through aligned openings in the two frame members and the plate.

The inner end of the pin is bent back on itself so as to bypass the inner frame member and project through a second opening in the plate which opening is spaced laterally on the plate from the inner frame member. The outer end of the pivot pin projects through an opening in a decorative cover or cap engaged over the outer frame member and the plate, that end of the pin terminating in a knob. Also a coil spring is compressed between the knob and the cap to bias the pivot pin outward so that its reentrant inner end is urged toward the outer frame member.

An opening is provided in the inner wall of the outer frame member which, when the scissor frame is in its open position, is aligned with the reentrant end of the pivot pin so that that end of the pin is urged by the spring into the opening, thereby locking the two frame members in that open position. The lock is released simply by pushing the knob inward against the spring bias which disengages the reentrant end of the pivot pin from the opening in the outer frame member permitting the two frame members to be oriented more or less parallel to one another in order to fold the walker.

Thus the pivot pin used in the present lock functions to pivotally connect the scissor frame members and to lock them in their open position. Therefore, the cost of installing this type of lock on a walker or other article employing a scissor frame is relatively inexpensive. The lock is easy to actuate because it is readily accessible at the side of the walker. Yet because it is a spring-type device, it is not easily manipulated by an infant sitting in the seat.

Accordingly, the lock should find wide application, particularly on infants' bouncers, walkers and other items of juvenile furniture.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 1:
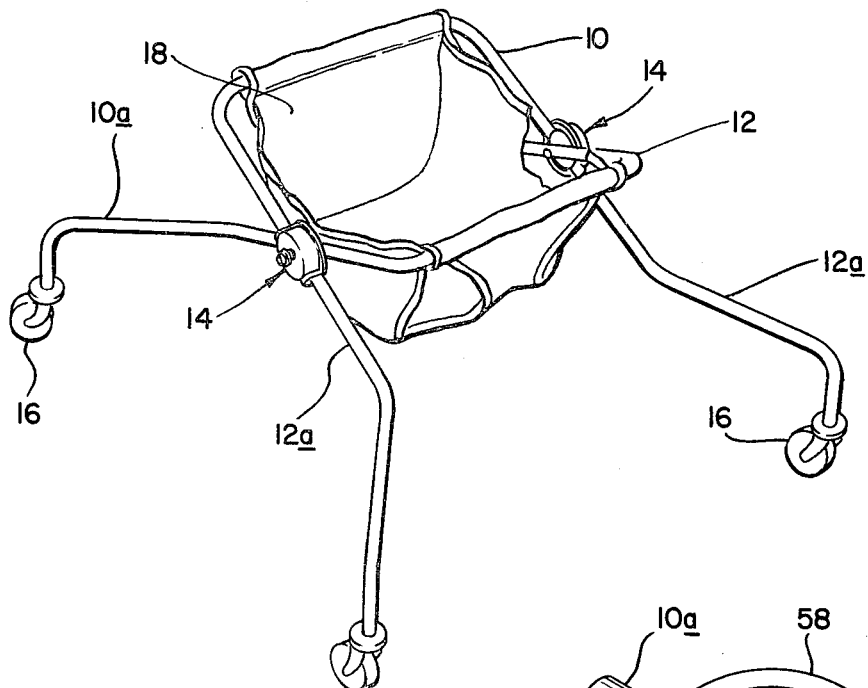
FIG. 1 is a perspective view of a baby walker employing a scissor frame lock made in accordance with this invention.

Referring to FIG. 1 of the drawing, the walker employing the subject lock includes a first generally U-shaped frame member 10 and a second U-shaped frame member 12, the corresponding legs 10a and 12a of the two frame members being juxtaposed with legs 10a positioned inside legs 12a. Corresponding legs of the two frame members are pivotally connected by a pivot assembly shown generally at 14 which also functions as a lock. Actually, a conventional pivot can be provided at one side of the walker since only one lock is required to maintain the walker in its erect position. The lower ends of the frame member legs are fitted with casters 16 so that the unit can roll along the ground and a conventional flexible bag seat 18 is suspended between the bights of the frame members for accommodating a child so that his feet can engage the floor to propel the walker.

Figure 2:
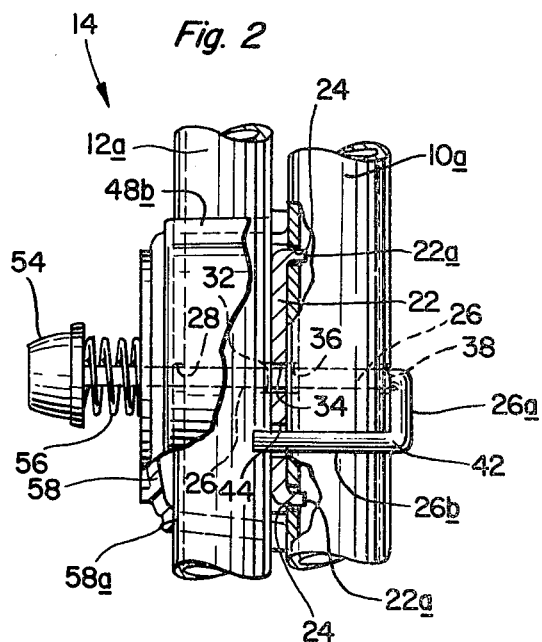
FIG. 2 is a side elevational view with parts broken away on a larger scale showing the disengaged lock in greater detail.
Figure 3:
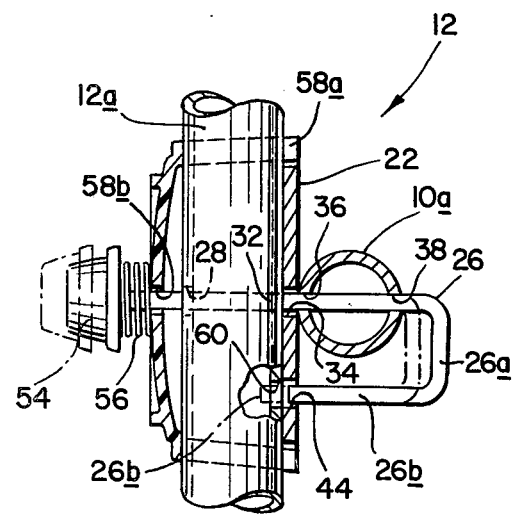
FIG. 3 is a view showing the lock engaged.

Turning now to FIGS. 2 and 3, the assembly 14 comprises a rigid metal plate 22 which is sandwiched between the frame member legs 10a and 12a at their point of intersection. Plate 22 has a pair of laterally extending tabs 22a which project through openings 24 in the outer wall of the frame member leg 10a so that the orientation of the plate relative to the leg 10a is fixed. A relatively long pivot pin 26 extends relatively loosely through a series of aligned openings in the frame member legs and plate, to wit: openings 28 and 32 in leg 12a, opening 34 in plate 22 and openings 36 and 38 in leg 10a. The inner end of the pivot pin beyond leg 10a is bent back on itself forming a bight 26a whose length is somewhat longer than the radius of leg 10a and a leg or end segment 26b which extends past frame member leg 10a through an opening 44 in plate 22.

When the pivot pin is positioned so that its bight 26a engages frame member leg 10a, the end segment 26b of the pivot pin projects beyond the inner wall or frame member leg 12a. The outer end of the pivot pin projecting beyond frame member leg 12a terminates in a knob 54. Also a coil spring 56 engaged around the pivot pin is compressed between knob 54 and leg 12a. More specifically, it is compressed between the knob and a generally cylindrical cap 58 engaged over frame member leg 12a and plate 22. The side walls of cap 58 are provided with openings 58a to accommodate the member 12a and central opening 58b to accommodate pin 26. The cap serves to conceal plate 22 and also to shield the child's fingers from the scissor frame pivot which constitutes a potential pinch point.

Figure 4:
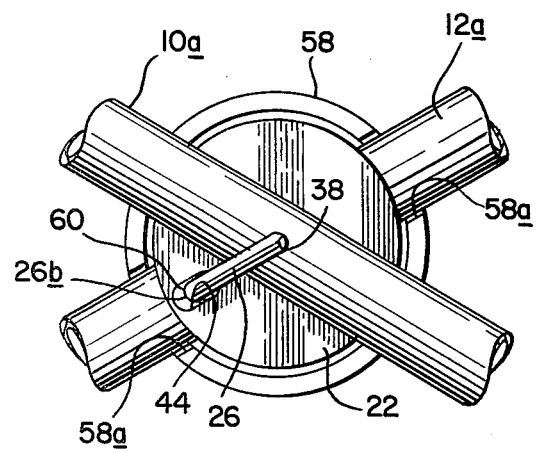
FIG. 4 is a rear view of the lock.

When the frame members 10 and 12 are oriented with their legs 10a and 12a more or less parallel to one another (as shown in FIG. 2), the pivot pin is biased outwardly by the spring 56 so that its end segment 26b projects through plate opening 44 and extends past frame member leg 12a. When the walker is in its open position, the frame member legs 10a and 12a are oriented more or less at right angles as shown in FIGS. 3 and 4. In that orientation, the leg 12a is disposed opposite the opening 44 in plate 22. In fact, in order to open the walker to that position, the knob 54 must be depressed to its position shown in solid lines in FIG. 3 so as to retract the pivot pin segment 26b end away from the leg 12a so as to permit the leg 12a to be positioned opposite opening 44. The leg 12a is formed with an opening 60 shown in FIGS. 3 and 4 disposed directly opposite opening 44 in plate 22 when the leg is in its open position shown in those figures. Consequently when the knob 54 is released, the spring 56 urges the pivot pin outward to its dotted line position shown in FIG. 3 with the result that the end of the pivot pin segment 26b projects into opening 60, thereby locking the leg 12a in that position so as to maintain the walker in its open or erect condition shown in FIG. 1.

In order to fold the walker again, the knob 54 must be depressed to its solid line position shown in FIG. 3 in order to retract the pivot pin segment 26b from the hole 60 in leg 12a so that the frame member legs 10a and 12a can be reoriented to their parallel position illustrated in FIG. 2.

It will be seen then that the single pin 26 functions both as the pivot for the legs 10a and 12a and the lock for maintaining those legs in their open position. Consequently, the lock 14 can be installed on furniture items employing scissor frames relatively inexpensively. Yet the lock is quite secure and readily accessible at the side of the walker as illustrated in FIG. 1 so that it can be released quickly and easily by the average adult. However, the lock is spring loaded and located below the sides of the bag seat 18 so that it is released only with difficulty by a child sitting in the walker. Finally, the lock cap 58 not only serves a decorative function, but also conceals the plate and pin portions of the lock and protects the walker occupant from potential pinch points.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

I claim:

1. A scissor frame lock for use particularly on a walker or other furniture item comprising a rigid plate sandwiched between corresponding juxtaposed tubular legs of the scissor frame at the location where the legs intersect, means for rotatively fixing the plate to one of said legs, means defining a series of aligned openings through the opposite walls of the two legs and the plate, a pivot pin slidably received in said aligned series of openings, one end segment of the pivot pin being turned back on itself forming a laterally extending bight whose length is greater than the radius of the frame leg adjacent that segment so as to extend past that segment and project through an opening formed in the plate spaced laterally from said leg, means defining another opening in the segment projects through said other plate opening and a second position wherein said pivot pin segment does not project through said other plate opening, a knob affixed to the opposite end of said pivot pin, a cover engaged over said other frame leg and said plate, said cover being formed with an opening for receiving the pivot pin so that said opposite end of the pivot pin projects beyond the cover, and a coil spring compressed between said knob and said cover for biasing said pivot pin to its said first position.

* * * * *

UNITED STATES PATENT AND TRADEMARK OFFICE
CERTIFICATE OF CORRECTION

PATENT NO. : 4,245,850

DATED : January 20, 1981

INVENTOR(S) : Robert J. Boudreau

It is certified that error appears in the above-identified patent and that said Letters Patent are hereby corrected as shown below:

Col. 4, Line 48, after "in the", insert --other leg for receiving the end of said pivot pin segment when said legs are oriented more or less perpendicular to one another, said pivot pin being slidable in said series of openings between a first position wherein the end of said pivot pin--

Signed and Sealed this

Fifteenth Day of September 1981

[SEAL]

Attest:

Attesting Officer

GERALD J. MOSSINGHOFF

Commissioner of Patents and Trademarks